(12) United States Patent
Kim

(10) Patent No.: US 6,176,127 B1
(45) Date of Patent: Jan. 23, 2001

(54) TECHNIQUE FOR JUDGING TIRE WIDTH AND TREAD OF VEHICLE

(75) Inventor: Jae-Nam Kim, Yongin-shi (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/111,928

(22) Filed: Jul. 8, 1998

(30) Foreign Application Priority Data

Jul. 8, 1997 (KR) ................................................ 97-31547

(51) Int. Cl.$^7$ ................................................ G01M 17/02
(52) U.S. Cl. ................................................ 73/146
(58) Field of Search ................................ 364/550, 551.01, 364/556, 560, 561, 563, 716, 716.03; 73/146; 250/358.1, 359.1, 360.1

(56) References Cited

U.S. PATENT DOCUMENTS 3,969,627 * 7/1976 Heisner et al. .................... 250/358.1

* cited by examiner

Primary Examiner—William Oen
(74) Attorney, Agent, or Firm—Robert E. Bushnell, Esq.

(57) ABSTRACT

A technique for judging the tire width and tread of a vehicle includes: a switch array including common contact points lying across a vehicle pass way, the common contact points being formed of a strip-shape conductor, and a plurality of individual contact points arranged in an equal distance, disposed on a plane parallel to and adjacent to a plane of the common contact points and having a predetermined distance therebetween, the individual contact points coming into contact with the common contact points when treading pressure is applied thereto; an interface for latching and shifting state data of each individual contact point in a predetermined scanning cycle; a data memory for storing the state data of each individual contact point, transmitted by the interface; a program memory for storing a system program for judging the tire width and tread of a vehicle; and a processor for processing the state data of individual contact points, stored in the data memory, using the system program stored in the program memory, to judge the tire width and tread of the vehicle.

9 Claims, 10 Drawing Sheets

TECHNIQUE FOR JUDGING TIRE WIDTH AND TREAD OF VEHICLE

CLAIM OF PRIORITY

This application makes reference to, incorporates the same herein, and claims all benefits accruing under 35 U.S.C. §119 from an application for TECHNIQUE FOR JUDGING TIRE WIDTH AND TREAD OF VEHICLE earlier filed in the Korean Industrial Property Office on Jul. 8, 1997 and there duly assigned Serial No. 31547/1997.

BACKGROUND OF THE INVENTION

1. Field of the Invention

The present invention relates to a technique for judging the tire width and tread of a vehicle and, more particularly, to a technique for judging the tire width and tread of a vehicle, in which a plurality of contact points are set in a treadle, lying across a road, and ON/OFF states of these contact points are scanned, to judge the tire width and tread of a vehicle, and then the detected tire width and the tread are provided as basic data for judging the kind of vehicle.

2. Description of the Related Art

A general highway toll collecting system is divided into a closed system which charges a toll according to the kind of a vehicle and the distance covered from an entrance tollgate to an exit tollgate, and an open system which charges a fixed toll depending on the kind of a vehicle passing through the tollgate. Unmanned toll collecting apparatuses are being introduced into these highway toll collecting systems, one of which is an apparatus for automatically judging the kind of vehicle, disclosed in Korean Patent Publication No. 86-2209 (Publication Date: Dec. 31, 1986).

In an earlier apparatus for automatically judging the kind of vehicle, a vehicle pass way corresponding to one lane through which vehicles pass is provided and vehicle separators are located opposite to each other and have the vehicle pass way therebetween. The vehicle separators have multiple pairs of light emitting devices and light receiving devices.

A treadle located across the vehicle pass way for measuring the tire width and tread of a vehicle includes resistance contact points. When the left and right tires of a passing vehicle tread on the contact points, the resistance value of the contact points changes and thus the tire width and tread can be measured based on the variation in the resistance value.

The treadle includes two contact point resistors, one located on the left side of the pass way and the other located on the right side of the pass way. The contact point resistors have narrow and long lower resistors and strip-shaped upper conductive resistors placed above the lower resistors by a predetermined distance therefrom. The treadle also includes a plurality of parallel contact points, their opening/closing patterns being used for judging the forward and backward motions of a vehicle passing through the pass way.

By measuring the various resistance values of the resistors, the tread and tire width of a vehicle passing through the pass way can be measured.

In an earlier apparatus for automatically judging the kind of vehicle, a treadle including contact point resistors as noted above is provided. Also provided is an interface circuit for converting the resistance value supplied from the treadle into a corresponding voltage and an A/D converter for converting the voltage from the interface circuit into corresponding digital data. Also provided is a memory circuit for storing a program for system operation and for temporarily storing data related to the tire width and treads of vehicles. Also provided is an interrupt controller for controlling the generation of an interrupt, and microprocessor for performing an operation for calculating the tire width and tread according to the system program stored in the memory, and main controller for finally judging the kind of vehicle according to digital data about the tire width and tread provided by the microprocessor and other various data and an interface circuit for interfacing the microprocessor with the main controller.

In the aforementioned method of judging the tire width and tread using the electrical resistance, the width of both tires and tread can not be measured without using the data from both contact point resistors.

However, when a vehicle passes through the pass way while driving all the way over towards one side thereof, both tires tread on only one of the contact point resistors and accordingly, data about one of the tires can not be obtained.

Furthermore, when the contact point resistors are short-circuited or open-circuited, errors are generated in the judgement of the tire width and tread.

In addition, it is impossible to individually manage a specific point of the contact point resistors.

Lastly, only after the treadle has been completely manufactured, can it be decided whether or not the treadle can be used and this increases a burden on its fabrication process.

SUMMARY OF THE INVENTION

Therefore, in order to overcome such drawbacks or problems of the related art, an object of the present invention is to provide a switching apparatus for judging the tire width and tread of a vehicle, in which a plurality of equidistant contact points, where only a part on which treading pressure is being applied is turned on, are arranged across a vehicle pass way, and the tire width and the tread are judged based on data concerning states of the contact points, to accurately judge the tire width and tread even if the vehicle passes the pass way, driving all the way over towards one side.

Another object of the present invention is to provide a technique for judging the tire width and tread of a vehicle, in which two switch arrays having a plurality of equidistant contact points, where only a part on which treading pressure is applied is turned on, are arranged in parallel across a vehicle pass way, and the tire width and tread are judged based on data about states of the contact points, to accurately judge the tire width and tread even if an error is generated in a part of the contact points, thereby increasing the life of the apparatus, and reducing risks in its fabrication process.

Still another object of the present invention is to provide technique for judging the tire width and tread of a vehicle, in which two switch arrays having a plurality of equidistant contact points, where only a part on which treading pressure is applied is turned on, are arranged in parallel across a vehicle pass way, and the tire width and tread are judged based on data about states of the contact points, introducing concept of a cut-off pattern and a short-circuit pattern, to remarkably reduce a possibility of malfunctioning in the apparatus even if some of the contact points are short-circuited.

A switching apparatus for judging the tire width and tread of a vehicle according to one aspect of the present invention comprises: common contact points lying across a vehicle pass way, the common contact points being formed of a strip-shape conductor; and a plurality of equidistant individual contact points, disposed in a plane parallel to and adjacent to a plane of the common contact points and having a predetermined distance therebetween, the individual contact points coming into contact with the common contact points when treading pressure is applied thereto.

An apparatus for judging the tire width and tread of a vehicle according to another aspect of the present invention comprises: a switch array including common contact points lying across a vehicle pass way, the common contact points being formed of a strip-shape conductor, and a plurality of equidistant individual contact points, disposed in a plane parallel to and adjacent to a plane of the common contact points and having a predetermined distance therebetween, the individual contact points coming into contact with the common contact points when treading pressure is applied thereto; an interface for latching and shifting state data of each individual contact point in a predetermined scanning cycle; a data memory for storing the state data of each individual contact point, transmitted by the interface; a program memory for storing a system program for judging the tire width and tread of a vehicle; and a processor for processing the state data of individual contact point, stored in the data memory, using the system program stored in the program memory, for judging the tire width and tread of the vehicle.

In this configuration, it is preferable to set two switch arrays across the vehicle pass way in parallel.

A method of judging the tire width and tread of a vehicle according to the present invention comprises the steps of: (a) scanning a state of each individual contact point of a switch array in a predetermined cycle, renewing and storing it, the switch array including common contact points lying across a vehicle pass way, the common contact points being formed of a strip-shape conductor, and a plurality of equidistant individual contact points, disposed in a plane parallel to and adjacent to a plane of the common contact points having a predetermined distance therebetween, the individual contact points coming into contact with the common contact points when treading pressure is applied thereto; (b) reading state data of each individual contact point stored at step (a), and judging if there is an individual contact point has turned on; (c) judging if a vehicle has been detected when there is an individual contact point turned on at step (b); (d) judging if an axle has completely passed when a vehicle has been detected at step (c); and (e) repeating from step (b) when an axle has not passed completely at step (d), and judging the tire width and tread on the basis of the state of the individual turned on contact points when the axle has passed completely.

In the above configuration, it is possible to further comprise the step (e1) of, upon the number of individual contact points turned on at step (e) exceeding a predetermined reference number, taking the number of individual contact points turned on as basic data for judging the tire width and tread, and ignoring it when the number of contact points turned on is less than the predetermined reference number.

Furthermore, it also possible to further comprise the steps (d1, e2) of, upon an individual contact point being turned on when a vehicle is not detected at step (d), accumulating and storing it as short-circuit data; and excluding the stored short-circuit data, and then judging the tire width and tread, when the tire width and the tread are judged at step (e).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Hereinafter a preferred embodiment of the present invention will be described with reference to the attached drawings.

Figure 1:
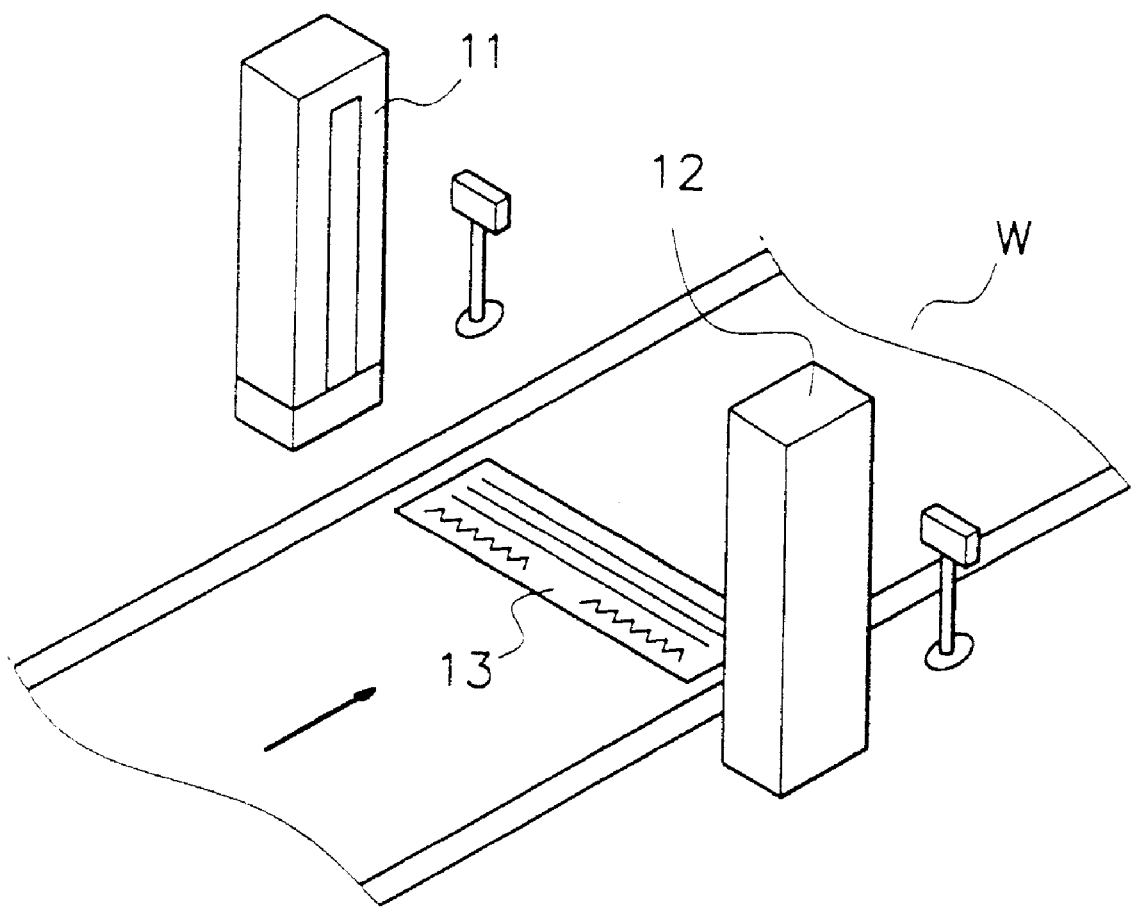
FIG. 1 is a perspective view showing a state of the installation of an earlier apparatus for automatically judging the kind of a vehicle.

FIG. 1 is a perspective view showing a state of installation of an earlier apparatus for automatically judging the kind of vehicle. In FIG. 1, reference symbol W indicates a vehicle pass way corresponding to one lane, through which vehicles pass, and reference numerals 11 and 12 denote vehicle separators located opposite to each other, and having the vehicle pass way W therebetween. The vehicle separators 11 and 12 have multiple pairs of light emitting devices (not shown) and light receiving devices (not shown). The multiple light emitting devices and the multiple light receiving devices respectively have identical optical axes.

Reference numeral 13 denotes a treadle (or wheel track), located across the vehicle pass way W, for measuring the tire width and tread of a vehicle. Treadle 13 includes resistance contact points which will be explained below. When the left and the right tires of a passing vehicle tread on the contact points, the resistance value of the contact points changes, and thus the tire width and tread can be measured based on the variation in the resistance value.

Figure 2:
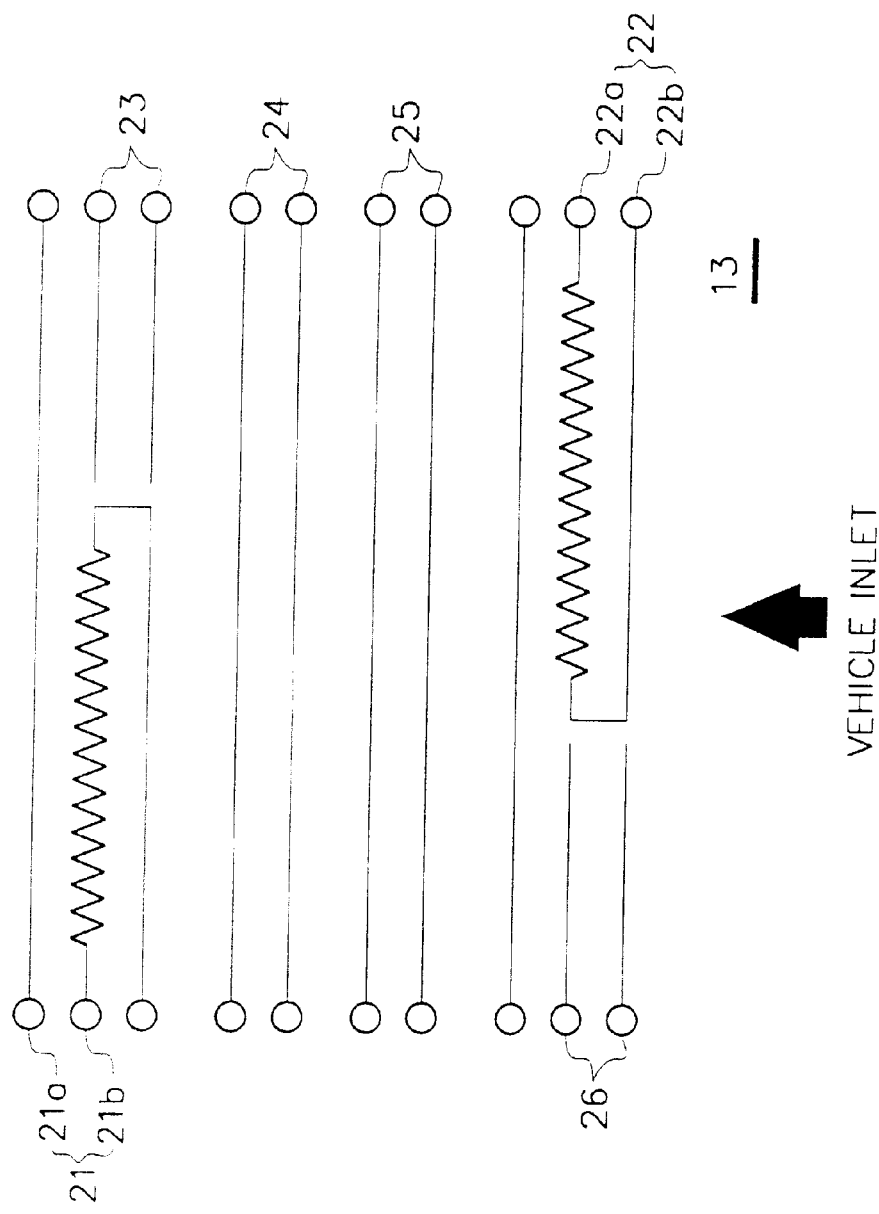
FIG. 2 is a diagram showing an electrical configuration of the treadle shown in FIG. 1.

FIG. 2 shows an electrical configuration of the treadle shown in FIG. 1. Referring to FIG. 2, treadle 13 includes two contact point resistors 21 and 22, one of them being located on the left side of the pass way W, the other one being located on the right side of the pass way W. Contact point resistors 21 and 22 respectively have narrow and long lower resistors 21*b* and 22*b*, and strip-shaped upper conductive resistors 21*a* and 22*a*, placed above lower resistors 21*b* and 22*b* by a predetermined distance therefrom. Treadle 13 also includes a plurality of parallel contact points 23 to 26, their opening/closing patterns being used for judging the forward and backward motions of a vehicle.

Figure 3:
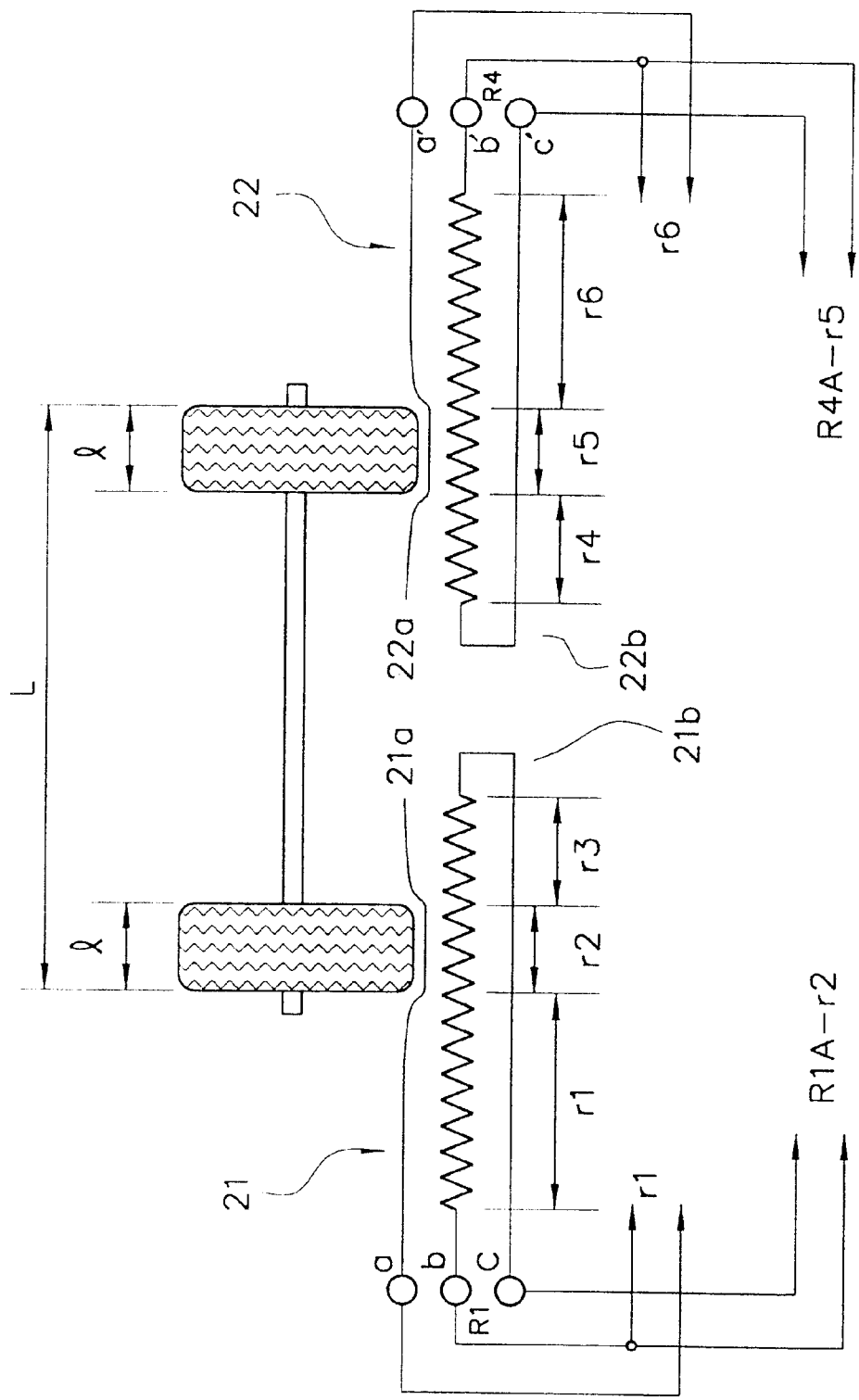
FIG. 3 is a diagram for explaining the operation principle of an earlier treadle.

FIG. 3 is a diagram for explaining the operation principle of the treadle. As shown in FIG. 3, contact point resistors 21 and 22 have three terminals a, b and c, and a', b' and c', respectively, terminals a and a' being connected to one side of upper contact points 21a and 22a respectively, terminals b and b' being connected to one side of resistors 21b and 22b respectively, terminals c and c' being connected to the other sides of resistors 21b and 22b respectively. It is assumed that a vehicle having a tire width C and tread L reaches treadle 13 and treads on contact point resistors 21 and 22 of the treadle. The left tire of the vehicle treads on the left contact point resistor 21 and its right tire treads on the right contact point resistor 22 because contact point resistors 21 and 22 are respectively located on the left and right sides of the vehicle pass way W. Then, a portion of left upper contact point 21a, on which the vehicle treads, sinks, to come into contact with lower resistor 21b. Likewise, a portion of right upper contact point 22a, on which the vehicle treads, sinks, to come into contact with lower contact point 22b.

It is assumed that the respective resistance values of the contact portion of resistors 21b and 22b are r2 and r5, the respective resistance values of the noncontact portions of resistor 21b and 22b, located on both sides of the contact portions, are r1 and r3, and r4 and r6 and the respective resistance values, when no vehicle treads on the contact points, are R1 and R4. Then, resistance values R1' and R4' across both terminals b and c and b' and c' of resistors 21b and 22b correspond to values obtained by respectively subtracting resistance values r2 and r5 of portions short-circuited due to the contact of upper contact points 21a and 22a from resistance values R1 and R4. That is, R1'=R1−r2 and R2'=R4−r5. Consequently, when the vehicle treads on the treadle, the resistance values R1 and R4 of resistors 21b and 22b are respectively changed into resistance values R140 and R4'.

As described above, because contact point resistors 21 and 22 are located on the left and right sides of the vehicle pass way W, lying across it, the value which results from adding the resistance across terminals a and b to the resistance across terminals a' and b' is closely related to the tread of a vehicle. Accordingly, the tread and tire width can be measured using these values.

Figure 4:
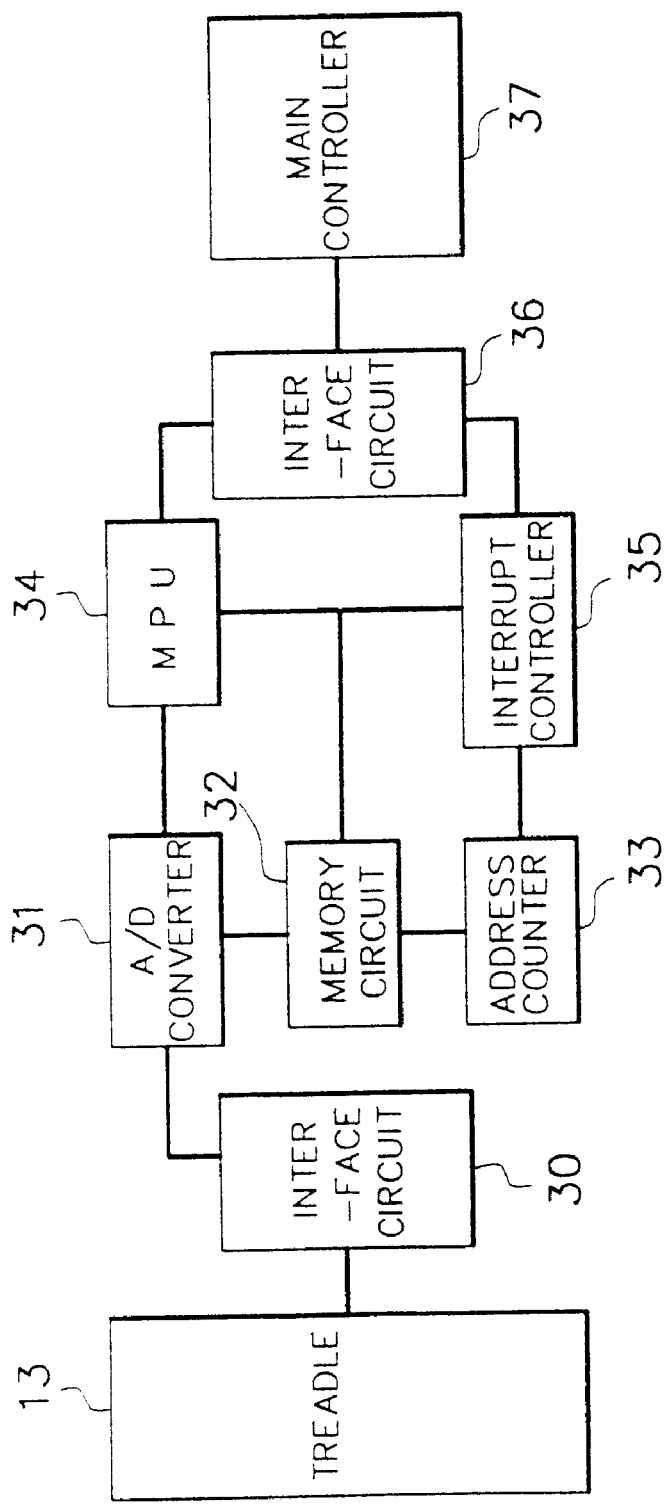
FIG. 4 is a block diagram of an earlier apparatus for automatically judging the kind of a vehicle.

FIG. 4 is a block diagram of an earlier apparatus for automatically judging the kind of vehicle. Referring to FIG. 4, the apparatus includes treadle 13 including contact point resistors 21 and 22, an interface circuit 30 for converting a resistance signal supplied from the treadle 13 into a corresponding voltage signal, an A/D converter 31 for converting the voltage signal supplied from the interface circuit 30 into corresponding digital data, a memory circuit 32 which stores a program for system operation, and temporarily stores data related the tire widths and treads of vehicles, and is used as an operation area, an address counter 33 for assigning addresses of the memory circuit 32, an interrupt controller 35 for controlling the generation of an interrupt, a microprocessor (MPU) 34 for performing an operation for calculating the tire width and tread according to the system program stored in the memory circuit 32, a main controller 37 for finally judging the kind of vehicle according to digital data about the tire width and tread provided by the microprocessor 34 and other various data, and an interface circuit 36 for interfacing the microprocessor 34 with the main controller 37. However, in the aforementioned method of judging the tire width and tread using the electrical resistance, the widths of both tires and tread cannot be measured without using the data from both contact point resistors, generating the following problems.

First of all, when the vehicle passes the pass way, while driving all the way over towards one side, both tires tread on only one of the contact point resistors. Thus, data about one of the tires cannot be obtained. Secondly, when the contact point resistors are short-circuited or open-circuited, errors are generated in the judgement of the tire width and tread. Thirdly, it is impossible to individually manage a specific point of the contact point resistors. Finally, only after the treadle has been completely manufactured, can it be decided whether or not the treadle can be used. This increases a burden on its fabrication process.

Figure 5:
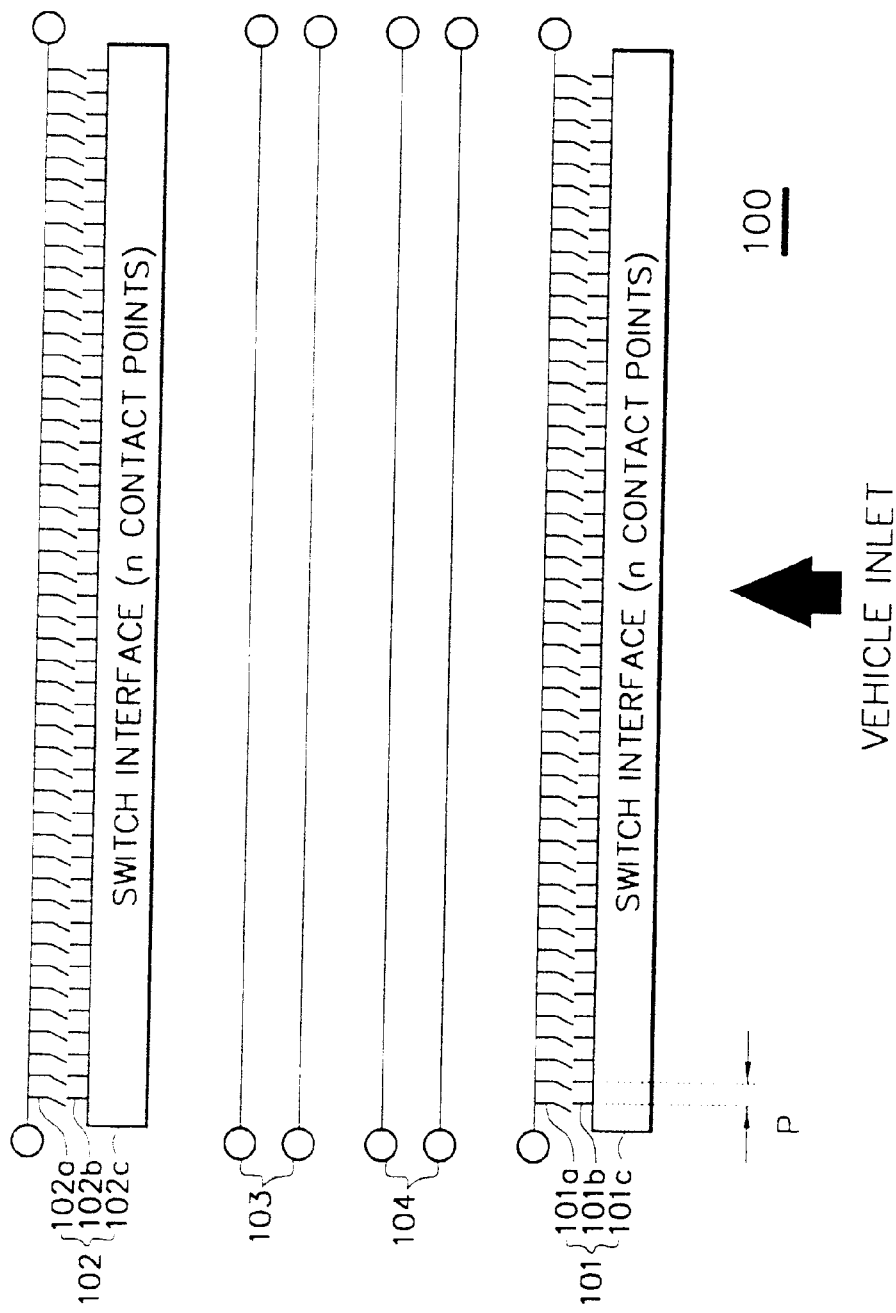
FIG. 5 is a diagram showing an electrical configuration of a treadle of an apparatus of judging lair the tire width and tread of vehicle according to a preferred embodiment of the present invention.

FIG. 5 is a diagram showing an electrical configuration of a treadle of an apparatus of judging the tire width and tread of a vehicle according to a preferred embodiment for the present invention. As shown in FIG. 5, a treadle 100 of the invention is arranged across a vehicle pass way, covering nearly entirely the width of the road. A switch array 101 is placed at the lower part of the treadle 100, and it includes common contact points 101a composed of strip-shape conductor, and n individual contact points 101b which are located under the common contact points 101a and have a predetermined distance therebetween and come into contact with common contact points 101a only when treading pressure is applied to the treadle. In FIG. 5, for convenience, common contact points 101a and individual contact points 101b are illustrated in the form of a switch. Individual contact points 101b are arranged, covered nearly entirely across the vehicle pass way in an equal distance p. Under the individual contact points 101b, there is a switch interface 101c composed of latch circuits and a shift register (not shown). The switch interface 101c latches and shifts data about the state of each individual contact point 101b in a predetermined scanning cycle T.

Meanwhile, as shown in FIG. 5, it is preferable to set a switch array 102 having the same structure as switch array 101 at the upper part of the treadle. In FIG. 5, reference numeral 102a denotes common contact points, 102b denotes individual contact points, and 102c denotes a switch interface. The switch interface 102c also latches and shifts data of the state of each individual contact point 102b in a predetermined scanning cycle T. By setting switch arrays 101 and 102 at the lower and the upper parts of the treadle, accuracy in judging the tire width and tread can be improved. For example, it is possible to judge the tire width and tread by taking the mean of data from switch arrays 101 and 102.

Furthermore, treadle 100 includes a plurality of parallel contact points 103 and 104 (two contact points in this embodiment) between the lower and upper switch arrays 101 and 102. Whether a vehicle moves forward or backward can be judged according to the ON/OFF patterns of these switch arrays 101 and 102 and the parallel contact points 103 and 104.

Figure 6:
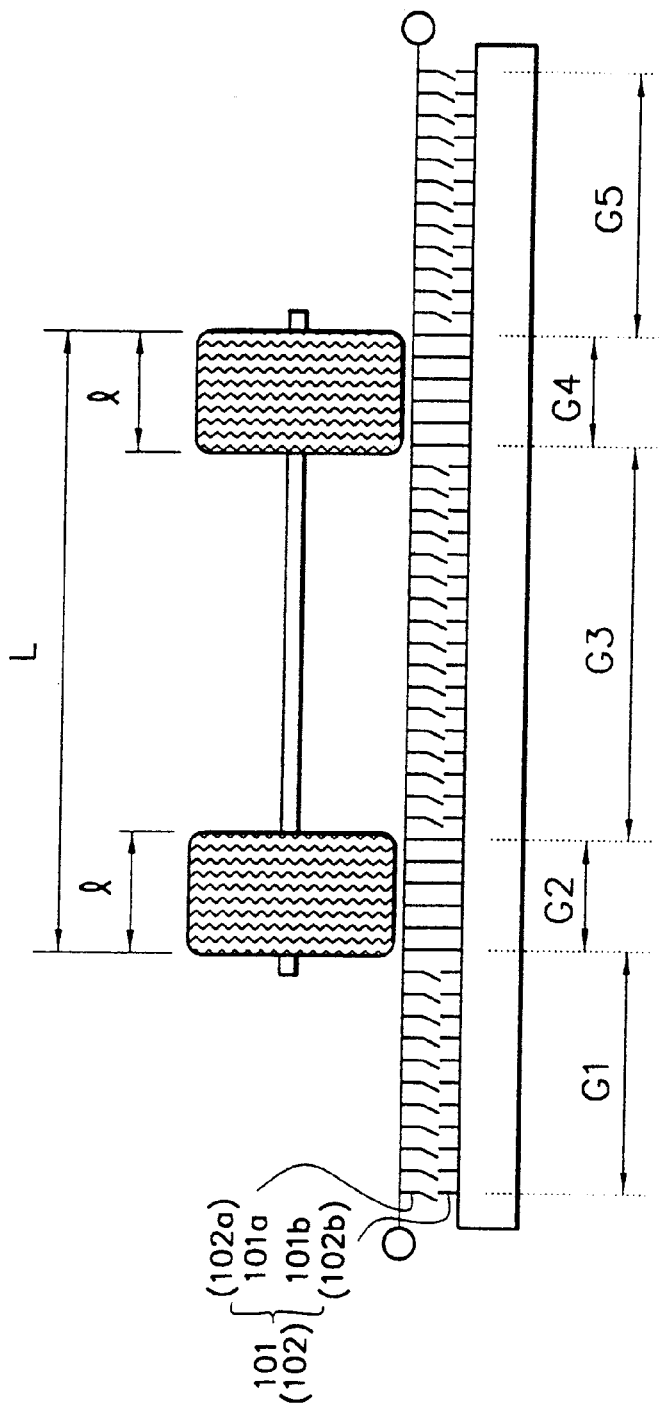
FIG. 6 is a diagram for explaining the operation principle of the treadle shown in FIG. 5.

FIG. 6 is a diagram for explaining the operation principle of the treadle shown in FIG. 5, and FIGS. 7A–7D are graphs showing the variations in the number of individual contact points which are turned on in normal and abnormal cases when treading pressure is applied. Though the operation principle is explained below with reference to only switch array 101 for convenience, it is apparent that switch array 102 also operates in the same fashion as switch array 101. As shown in FIG. 6, a microprocessor, which will be described below, scans individual contact points 101b of switch array 101 of treadle 100 in a predetermined cycle T, thereby, when an individual contact point 101b turned on exists, making effective the turn-on signal of the corresponding individual contact point 101b.

It is assumed that a vehicle having the tire width p and tread L reaches switch array 101 of treadle 100 and applies treading pressure on it. Then, a part of the common contact points 101a to which the treading pressure is applied sinks, to turn on a portion of the individual contact points 101b, disposed under a portion of the common contact points 101a. On the other hand, the portion of the individual contact points corresponding to the remaining portion of the common contact points 101a to which the treading pressure is not applied are maintained in a turned-off state. In this case, the widths of both tires correspond to "G2" and "G4", respectively, more specifically, to (the number of individual contact points 101b included in sections "G2") X (switch arrangement interval p) and (the number of individual contact points 101b included sections "G4") X (switch arrangement interval p). The widths ranging from the both ends of the treadle to both ends of the tires correspond to "G1" and "G5", and the tread becomes "G2"+"G3"+"G4".

Figure 7:
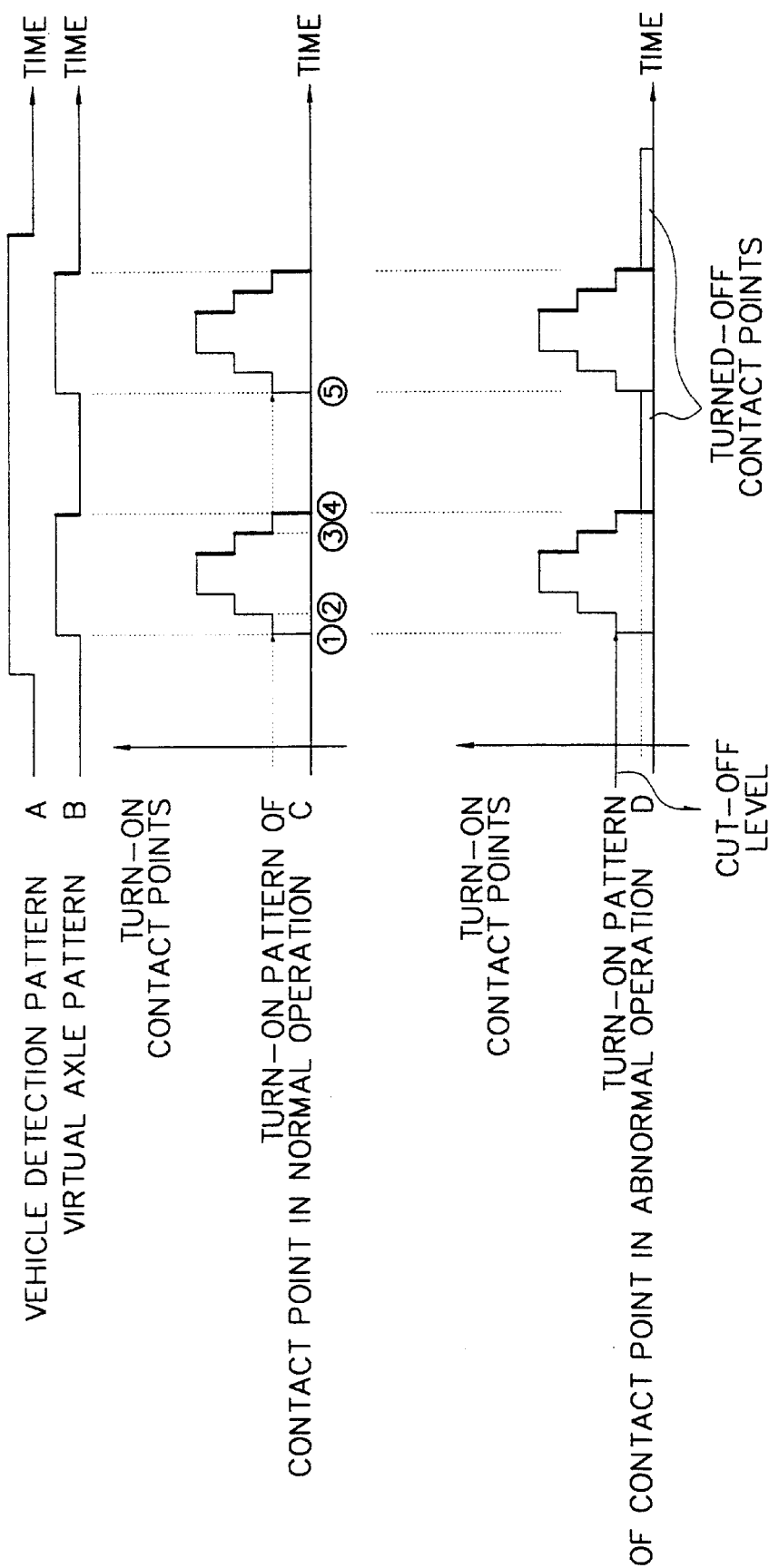
FIGS. 7A–7D are graphs showing the variations in the number of individual contact points which are turned on in normal and abnormal cases when treading pressure is applied to the treadle.

Meantime, referring to FIG. 7C, the variation in the number of individual contact points 101b turned on when the treading pressure is applied increases stepwise, starting from a point ① where the initial treading pressure is applied to a point ④ where the treading pressure is finally applied, and then decreases, on the basis of time. In this process, individual contact points 101b may be in a discontinuous state, for example, ON-OFF-ON-OFF-ON state, according to the tire state of the vehicle or the state of the treadle 100. Thus, a resultant value obtained by scanning from point ① to point ④ is accumulated and stored in a data storage unit to be described below, and the tire width and tread of the vehicle, and widths ranging from both outward ends of the treadle to both ends of the tire are calculated from the accumulated result. That is, when individual contact point 101b turned on exists at least once during the scanning process, corresponding individual contact point 101b is considered to be turned on in the final accumulated result.

Furthermore, as shown in FIG. 7D, there may be individual contact points 101b turned off during the period from point ④, where the treading pressure is finally applied, to a point ⑤ where the treading pressure of the following axle is applied, because of mechanical problems in the treadle 100 itself or problems due to physical contact. In this case, the treading pressure of the following axle of a vehicle may not be applied. Accordingly, to prevent these problems, the present invention introduces a cut-off level concept. In other words, when the number of individual contact points 101b turned on is less than the cut-off number, data about the turned on state of the individual contact points 101b is accumulated and stored in the data storage, but a contact point turn-on signal is not allowed to be effective.

Furthermore, the present invention introduces a short pattern concept in order to prevent the delay in turning off of a part of the individual contact points 101b from affecting the following vehicle as well as the following axle. This short pattern concept is introduced on the basis that the treading pressure can be applied only when a vehicle can be detected. A method of realizing this concept is that a short pattern is removed from the final accumulation pattern under the state in which the vehicle can be detected, and then the width and the location of the tire are determined.

Figure 8:
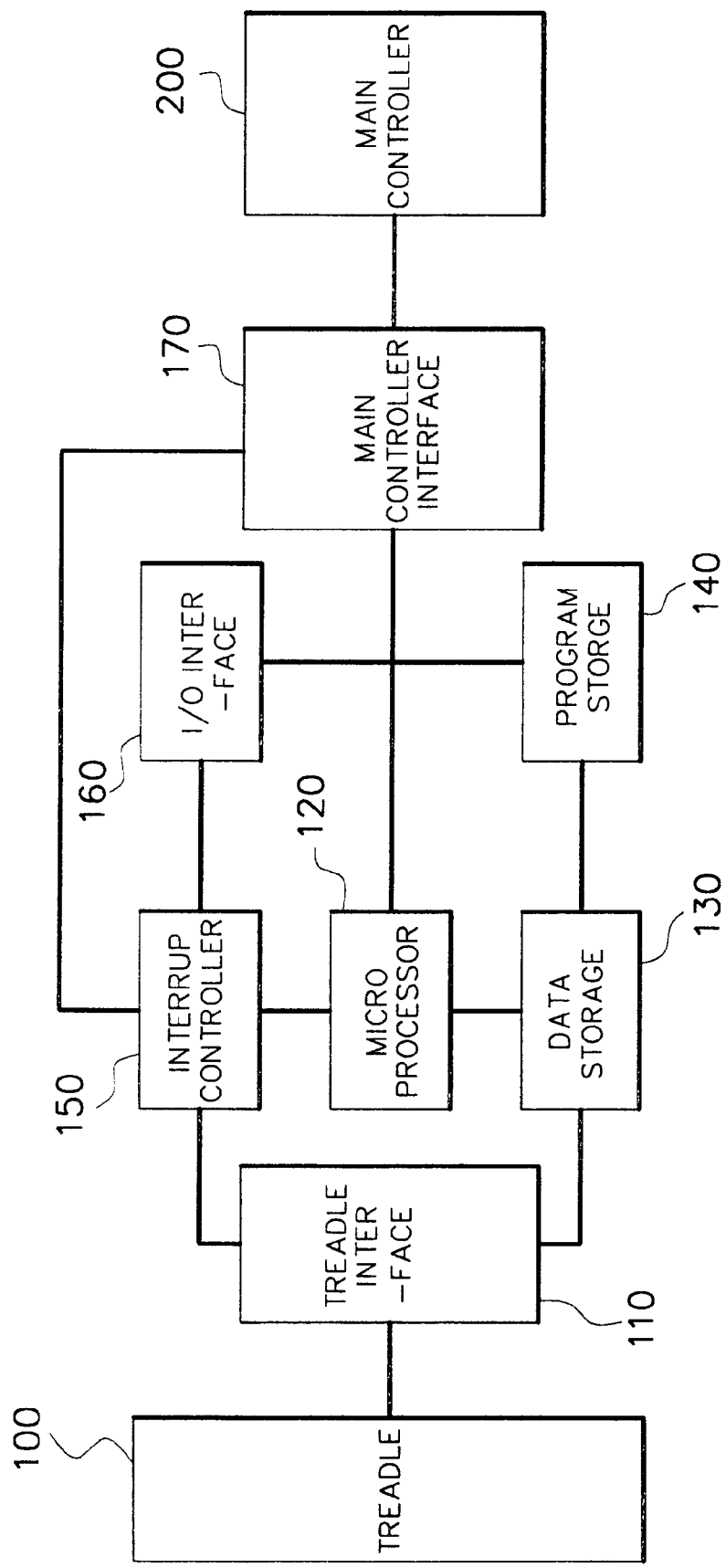
FIG. 8 is a block diagram of the apparatus for judging the tire width and tread of vehicle according to a preferred embodiment of the present invention.

FIG. 8 is a block diagram of the apparatus for judging the tire width and tread of a vehicle according to a preferred embodiment of the invention. Referring to FIG. 8, the apparatus includes: a microprocessor 120 for controlling the entire operation of the apparatus and for calculating the tire width and tread of a vehicle; treadle 100 having switch arrays 101 and 102 (not shown) disposed at its lower and upper parts, and switch interfaces 101c and 102c (not shown) for latching and sequentially shifting a state of each individual contact points 101b and 102b of switch arrays 101 and 102; a treadle interface 110 for interfacing the transmission of scan data between microprocessor 120 and switch interfaces 101c and 102c; a data storage 130 unit for storing data obtained by scanning a state of individual contact points 101b and 102b during every scanning cycle T; a program storage unit 140 in which a system program is included; an interrupt controller 150 for controlling the generation of an interrupt; an I/O interface 160 for interfacing the transmission of data between parallel contacts 103 and 104 (not shown) included in the treadle 100 and a vehicle separator (not shown), and microprocessor 120; a main controller 200 for receiving data about the tire width and tread calculated by the microprocessor 120 and for judging the kind of vehicle; and a main controller interface 170 for interfacing the transmission of data between the microprocessor 120 and the rain controller 200.

The operation of the apparatus and method for judging the tire width and tread of a vehicle of the invention having the above configuration is explained below.

Figure 9A:
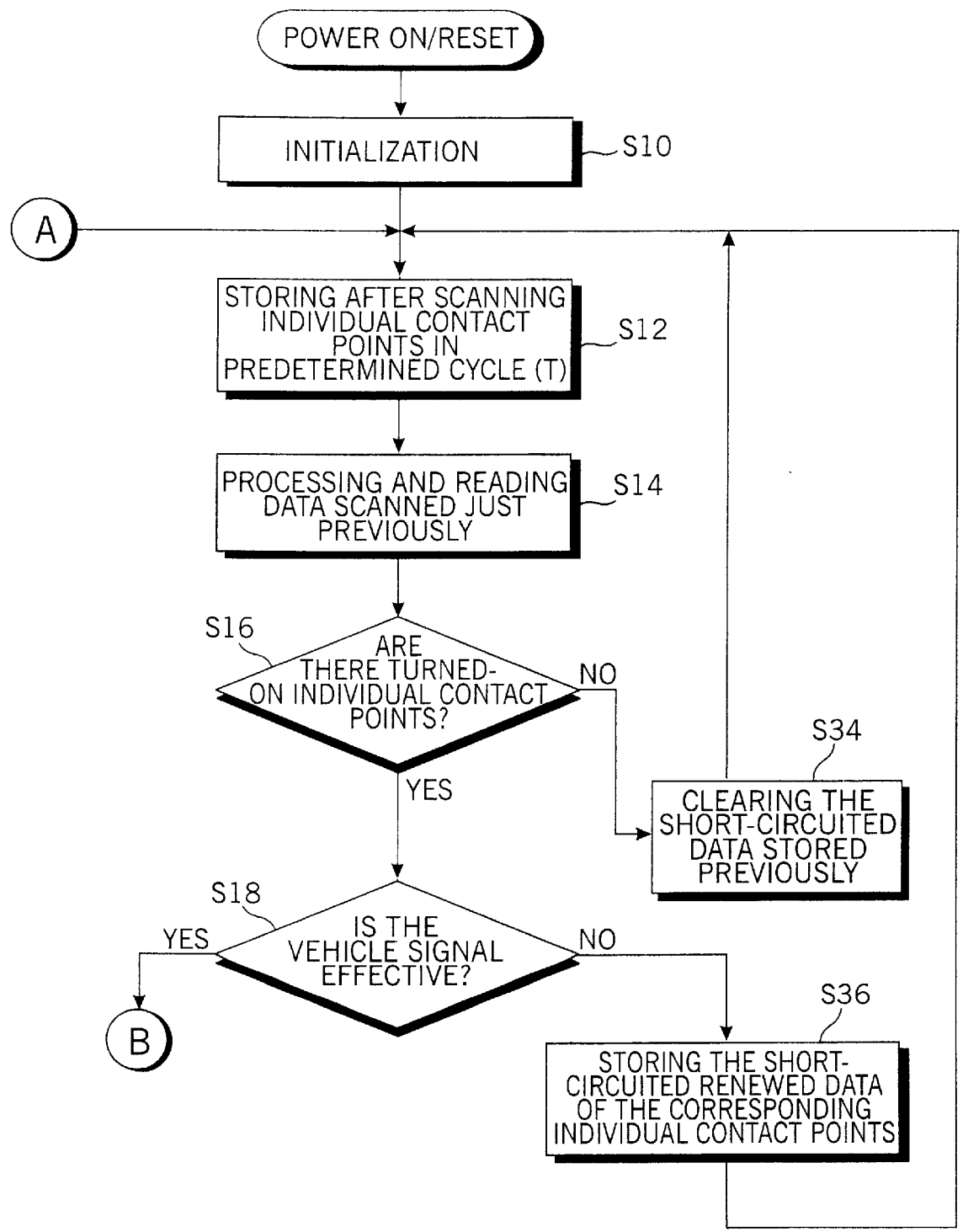
FIGS 9A and 9B together form a flowchart for explaining a method of judging the tire width and tread of a vehicle according to a preferred embodiment of the present invention.
Figure 9B:
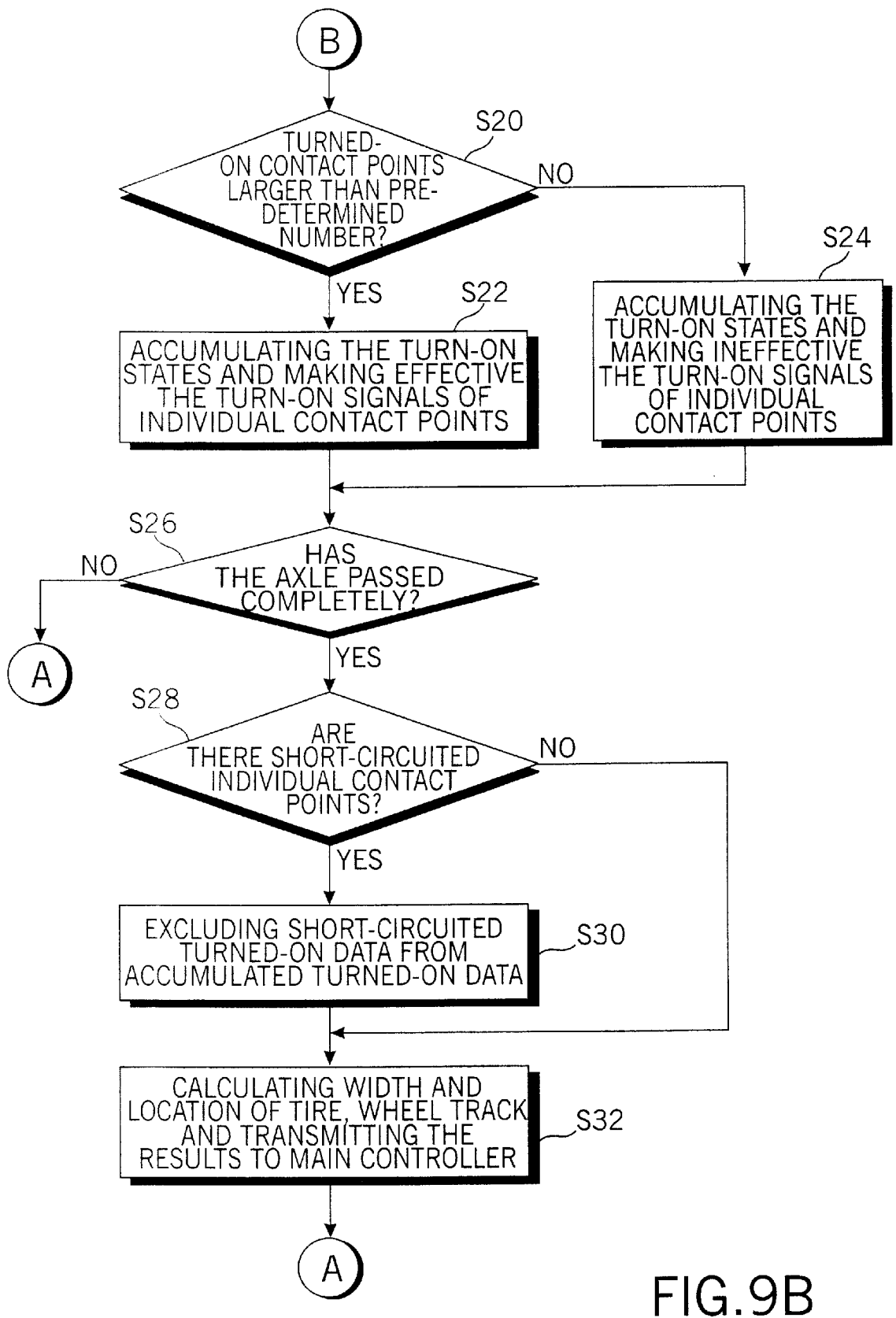

FIGS. 9A and 9B together form a flowchart for explaining a method of judging the tire width and tread of a vehicle according to a preferred embodiment of the invention. Referring to FIG. 9, the microprocessor 120 performs initialization according to the supply of power or applying of a reset signal at step S10, and then scans individual contact points 101b and 102b of switch arrays 101 and 102 of treadle 100 in a predetermined cycle T at step S12. For convenience, the explanation will be made with reference to only the lower switch array 101 hereinafter.

The scanning process is carried out in such a manner that switch interface 101c inside treadle 100 latches the current state of individual contact points 101b, and the latched state data of individual contact points 101b is sequentially output to treadle interface 110. The treadle interface 110 stores output scan data in the data storage 130, and informs the microprocessor 120 of the storing of scan data at a point when the storing of state data of all the individual contact points 101b of the switch array 101 has been completed. At this time, the microprocessor 120 makes the treadle interface 110 scan the following state of individual contact points 101b and write it in the data storage 130 in order to reduce the time T required for the scanning. Accordingly, at step S14, the microprocessor 120 reads and processes the state data of individual contact points 101b stored in the data storage 130 right before the writing of the following state data.

The state of each individual contact point 101b is expressed as one bit, that is, $0_2/1_2$ according to its ON/OFF state. For example, when the state of individual contact point 101b is "OFF-OFF-ON-OFF", the data written in the data storage 130 is expressed as "$1101_2$". In other words, the bit value in the case of an individual contact point 101b being turned on is expressed as $0_2$, and is expressed as $1_2$ in the case of an individual contact point 101b being turned off. At step S16, the microprocessor 120 reads the state data of the individual contact points 101b, written in the data storage 130 by the treadle interface 110, then step S16 proceeds to step S18, and a judgement is made as to whether or not a turned on individual contact point 101b exists. When it exists, the microprocessor 120 reads a vehicle detection signal through the I/O interface 160, and judges if the vehicle detection signal is effective. For example, the microprocessor judges if the vehicle detection signal is in a "high" level state, as shown in FIG. 7A. Step S18 may be performed by signals supplied from the vehicle separators 11 and 12 as described above with regard to the earlier apparatus.

When the vehicle detection signal is determined to be effective as a result of the judging at step S18, then step S18 proceeds to step S20, and the microprocessor judges whether or not the number of individual contact points 101b turned on is larger than the cut-off number which may be predetermined by experiments. When the number of turned-on individual contact points 101b exceeds the cut-off number, the step S20 proceeds to step S22, and the microprocessor stores the state data in the data storage 130, which is renewed by bit-wise-ANDing the current state data of each individual contact point 101b and the state data accumulated just previously, and makes effective the turn-on signal of the individual contact points 101b.

On the other hand, when the number of individual contact points 101b turned on is determined to be smaller than the cut-off number as a result of the judging at step S20, then step S20 proceeds to step S24, and microprocessor stores the state data in the data storage 130, which is renewed by bit-wise-ANDing the current state data of each individual contact point 101b and the state data accumulated just previously, but makes ineffective the turn-on signal of the individual contact points 101b.

It is judged at step S26 if the axle of the vehicle has passed the treadle completely, step S26 being performed if an axle interrupt is generated by the main controller 200. The axle interrupt service routine reads whether or not the axle detection result is effective, through the I/O interface 160. When the axle detection result is effective, steps S28, S30 and S32 are sequentially carried out, and when the axle detection result is not effective or the axle interrupt is not generated, the process returns to step S12.

At step S28, it is judged that if any individual contact points 101b are short-circuited. When there is an individual contact point 101b which is not turned off even after the axle has passed completely at step S28, the microprocessor stores data, obtained by removing the data of any short-circuited individual contact point from the state data accumulated just previously, as the final state data, at step S30. This step S30 may be carried out by bit-wise-ORing the state data accumulated just previously and data of any short-circuited individual contact point. Thereafter, the step S30 proceeds to step S32, and the tire's width and location and the tread are calculated according to the above method which has been described with reference to FIG. 6, and then the calculated results are transmitted to the main controller 200 at step S32.

Meanwhile, when the vehicle detection signal is made not effective as a result of the judging at step S18, it means that there is a short-circuited individual contact point 101b. In this case, the process proceeds to step S36 where the short-circuited state is bit-wise-reversed, to be stored as short-circuit data. This stored data is excluded from the basic data for judging the tire width and tread.

When there is individual contact point 101b turned on at step S16, it means that the state of the individual contact point 101b previously short-circuited has recovered. Then, the process proceeds to step S34, clearing the short-circuit data previously stored in the data storage 130.

It will be apparent to those skilled in the art that various modifications and variations can be made in the apparatus for judging the tire width and tread of a vehicle of the present invention without departing from the spirit or scope of the invention. For example, although the common contact points are located in the upper portion of the treadle and individual contact points are located in the lower portion of the treadle in the aforementioned embodiment, it is also possible to respectively set the common contact points and individual contact points in the lower and upper portions of the treadle.

What is claimed is:

1. A method of judging the tire width and tread of a vehicle, comprising the steps of:
    (a) scanning a state of each individual contact point of a switch array in a predetermined cycle, renewing and storing the state, the switch array including common contact points lying across a vehicle pass way, the common contact points being formed of a strip-shape conductor, and a plurality of equidistant individual contact points, disposed on a plane parallel to and adjacent to a plane of the common contact points and having a predetermined distance therebetween, the individual contact points coming into contact with the common contact points when treading pressure is applied thereto;
    (b) reading state data of each individual contact point stored at step (a), and judging if there is an individual contact point turned on;
    (c) judging if a vehicle has been detected when it has been determined that there is an individual contact point turned on at step (b);
    (d) judging if an axle has completely passed when it has been determined that vehicle has been detected at step (c); and
    (e) repeating from step (b) when it has been determined that the axle has not passed completely at step (d), and judging the tire width and tread on the basis of the state of the individual contact points turned on when the axle has passed completely.

2. The method as claimed in claim 1, further comprising the step of (e1) upon the number of individual contact points being turned on at step (e) exceeding a predetermined reference number, taking the number of individual contact points turned on as basic data for judging the tire width and tread, and ignoring the number of contact points turned on when the number is less than the predetermined reference number.

3. The method as claimed in claim 2, further comprising the steps of:
    (d1) upon an individual contact point being turned on when a vehicle has not been detected at step (d), accumulating and storing the individual contact point as short-circuit data; and
    (e2) excluding the short-circuit data stored at step (d1), and then judging the tire width and tread, when the tire width and tread are judged at step (e) or (e1).

4. The method as claimed in claim 1, the renewing and storing of data at step (a) being carried out by bit-wis-ANDing of a previous state and a current state of an individual contact point, to accumulatively store the states.

5. The method as claimed in claim 2, the renewing and storing of data at step (a) being carried out by bit-wise-ANDing of a previous state and a current state of an individual contact point, to accumulatively store the states.

6. The method as claimed in claim 3, the renewing and storing of data at step (a) being carried out by bit-wise- ANDing of a previous state and a current state of an individual contact point, to accumulatively store the states.

7. The method of claim 4, further comprising the steps of:
providing a plurality of common contact points lying across a vehicle pass way, the common contact points being formed of a strip-shape conductor; and
providing a plurality of individual equidistant contact points, disposed on a plane parallel to and adjacent to an plane of the common contact points and having a predetermined distance therebetween, the individual contact points coming into contact with the common contact points when treading pressure is applied thereto.

8. The method of claim 4, further comprising the steps of:
providing a switch array including common contact points lying across a vehicle pass way, the common contact points being formed of a strip-shape conductor, and a plurality of individual equidistant contact points, disposed on a plane parallel to an adjacent to an plane of the common contact points and having a predetermined distance therebetween, the individual contact points coming into contact with the common contact points when treading pressure is applied thereto;
providing an interface for latching and shifting state data of each individual contact point in a predetermined scanning cycle;
providing a data memory for storing the state data of each individual contact point, the data being transmitted by the interface;
providing a program memory for storing a system program for judging the tire width and tread of a vehicle; and
providing a processor for processing the state data of individual contact points, stored in the data memory, using the system program stored in the program memory, to judge the tire width and tread of the vehicle.

9. The method of claim 8, further comprising the step of providing the switch array comprising two arrays which lie across the vehicle pass way in parallel.

* * * * *